United States Patent
Wiener et al.

(10) Patent No.: US 12,269,966 B2
(45) Date of Patent: Apr. 8, 2025

(54) AQUEOUS-BASED RELEASE COATINGS AND ARTICLE THEREFROM

(71) Applicant: 3M INNOVATIVE PROPERTIES COMPANY, St. Paul, MN (US)

(72) Inventors: Clinton G. Wiener, Stillwater, MN (US); Mahfuza B. Ali, Mendota Heights, MN (US); Maria A. Appeaning, St. Paul, MN (US); Ibrahim A. El Hedok, Concord, NC (US); Phillip H. Henna, Cottage Grove, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 489 days.

(21) Appl. No.: 17/614,750

(22) PCT Filed: Jun. 15, 2020

(86) PCT No.: PCT/IB2020/055578
§ 371 (c)(1),
(2) Date: Nov. 29, 2021

(87) PCT Pub. No.: WO2020/261037
PCT Pub. Date: Dec. 30, 2020

(65) Prior Publication Data
US 2022/0228005 A1 Jul. 21, 2022

Related U.S. Application Data

(60) Provisional application No. 62/866,791, filed on Jun. 26, 2019.

(51) Int. Cl.
| | |
|---|---|
| C09D 133/16 | (2006.01) |
| C08F 20/34 | (2006.01) |
| C08J 7/04 | (2020.01) |
| C09D 5/02 | (2006.01) |
| C09D 7/45 | (2018.01) |
| C09D 7/63 | (2018.01) |

(52) U.S. Cl.
CPC ............ C09D 5/022 (2013.01); C08F 20/34 (2013.01); C08J 7/0427 (2020.01); C09D 7/45 (2018.01); C09D 7/63 (2018.01); C09D 133/16 (2013.01); C08J 2323/06 (2013.01); C08J 2323/08 (2013.01); C08J 2323/12 (2013.01); C08J 2331/04 (2013.01); C08J 2433/16 (2013.01)

(58) Field of Classification Search
CPC ...... C08F 120/34; C08F 20/34; C08F 220/34; C08F 26/06; C09D 133/14; C09D 133/16
See application file for complete search history.

(56) References Cited

U.S. PATENT DOCUMENTS

| | | |
|---|---|---|
| 2,607,711 A | 8/1952 | Hendricks |
| 3,011,988 A | 12/1961 | Luedke |
| 5,225,480 A | 7/1993 | Tseng |
| 5,284,690 A | 2/1994 | Williams et al. |
| 5,413,815 A | 5/1995 | Williams et al. |
| 5,516,581 A | 5/1996 | Kreckel |
| 6,403,206 B1 | 6/2002 | Bries |
| 7,459,167 B1 | 12/2008 | Sengupta et al. |
| 9,247,736 B2 | 2/2016 | Ylitalo |
| 10,975,525 B2 | 4/2021 | Cimpeanu et al. |
| 2012/0015200 A1 | 1/2012 | Ali |
| 2012/0315499 A1 | 12/2012 | Isaki et al. |
| 2014/0170362 A1 | 6/2014 | Ali |
| 2016/0280955 A1 | 9/2016 | Olson et al. |
| 2017/0007464 A1 | 1/2017 | Liu |

(Continued)

FOREIGN PATENT DOCUMENTS

| | | |
|---|---|---|
| CN | 1089284 A | 7/1994 |
| CN | 107075325 A | 8/2017 |

(Continued)

OTHER PUBLICATIONS

Goldstein, "Novel Technology For Non-Silicone, Non-Solvent-Based Release Coatings", Adhesives And Sealants Industry, 2017, pp. 17-19.
Hamid, "Novel Quaternary Ammonium Amphiphilic (Meth)Acrylates: 2 Thermally And Photochemically Initiated Polymerizations", Polymer, 1987, vol. 28, No. 02, pp. 332-339.
Nagai, "Polymerization of Surface-Active Monomers: 4 Copolymerization of Long-Chain Alkyl Salts Of 2-Dimethylaminoethyl Methacrylate With Methyl Methacrylate Or Styrene", Polymer, 1992, vol. 33, No. 14, pp. 3060-3065.

(Continued)

*Primary Examiner* — Callie E Shosho
*Assistant Examiner* — Krupa Shukla
(74) *Attorney, Agent, or Firm* — Julie Lapos-Kuchar

(57) ABSTRACT

Described herein is a latex coating composition comprising particles of polymer and articles therefrom, wherein at least 60% of interpolymerized monomeric units of the polymer are of formula I, wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11 to 21, and A is a counter anion.

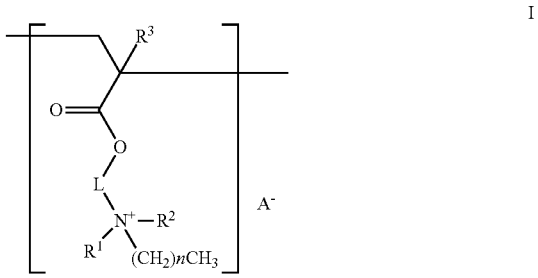

I

11 Claims, No Drawings

(56) References Cited

U.S. PATENT DOCUMENTS

2017/0121567 A1   5/2017  Kawasaki
2021/0238441 A1   8/2021  Olson et al.

FOREIGN PATENT DOCUMENTS

| CN | 107428881 A | 12/2017 |
|---|---|---|
| CN | 108602921 A | 9/2018 |
| JP | 6031234 | 7/1985 |
| JP | 8325538 A2 | 12/1996 |
| JP | 2001-106732 A2 | 4/2001 |
| JP | 2004-339347 A2 | 12/2004 |
| JP | 5281554 B2 | 9/2013 |
| WO | 198402915 | 8/1984 |
| WO | WO 2014-093375 | 6/2014 |

OTHER PUBLICATIONS

Nagarkar, "P-218L: Late-News Poster: Antimicrobial Coatings That Prevent Bacterial Growth On Touchscreens", SID International Symposium Digest Of Technical Papers, 2011, vol. 42, No. 01, pp. 1860-1861.

International Search Report for PCT International Application No. PCT/IB2020/055578, mailed on Sep. 1, 2020, 5 pages.

Nagai_"Polymerization of surface-active monomers. II. Polymerization of quarternary alkyl salts of dimethylaminoethyl methacrylate with different alkyl chain length", Journal of Polymer Science Part A.: Polymer Chemistry, vol. 25, No. 1, Jan. 1, 1987, pp. 1-14.

Rios_"Adsorption of poly-2-(dimethylamino) ethylmethacrylate-N-alkyl quaternized at the water/chloroform interface," Colloids and Surfaces A: Physicochemical and Engineering Aspects, vol. 364, (2010), pp. 61-66.

AQUEOUS-BASED RELEASE COATINGS AND ARTICLE THEREFROM

TECHNICAL FIELD

A latex coating composition is disclosed comprising a quaternary ammonium polymer. Such latex coating compositions can be used as release coatings.

BACKGROUND

Normally tacky and pressure sensitive adhesive (PSA) materials, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants. In order to allow a roll of tape to be unwound without the undesirable transfer of adhesive to the tape backing, it is customary to provide, the back of the tape, opposite the adhesive side, with a release coating, also referred to as a low adhesion backsize. Similarly, the release sheet or liner, to which the adhesive coated label is typically laminated, is supplied with a release coating to permit the easy removal of the liner from the label. These release coatings are expected to reproducibly provide an appropriate level of release to the adhesive of interest, to not deleteriously affect the adhesive, and to be resistant to aging so that the release level remains relatively stable with time.

SUMMARY

There is a desire to identify a novel aqueous-based release coating. In one embodiment, there is a desire to identify a release coating that has improved performance. In one embodiment, there is a desire to identify a release coating that forms a releasable layer at lower temperatures.

In one aspect, a latex coating composition is described. The latex coating comprises particles of polymer, wherein at least 60% of the interpolymerized monomeric units of the polymer are according to formula I

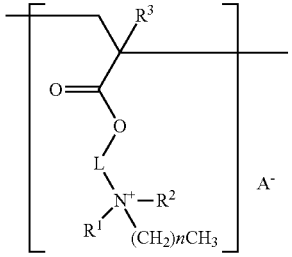

wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11 to 21, and A is a counter anion.

In one embodiment, a release coated article is described. The release coated article comprises a substrate and a release coating disposed thereon, wherein the substrate is a polymeric substrate and the release coating comprises a polymer, wherein at least 60 weight % of the polymer comprises an interpolymerized monomeric unit according to formula I

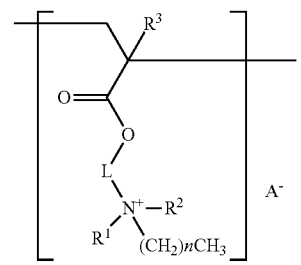

wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11 to 21, and A is a counter anion.

In another embodiment, a method of making a film-coated substrate is described. The method comprising: coating a substrate with the latex coating composition described above to form a wet-coated substrate; and drying the wet-coated substrate at a temperature of less than 100° C., or even less than 50° C. to form the film-coated substrate.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"backbone" refers to the main continuous chain of the polymer;
"interpolymerized" refers to monomers that are polymerized together to form a polymer backbone; and
"monomer" is a molecule which can undergo polymerization which then form part of the essential structure of a polymer;
"monomer unit" refer to the largest constitutional unit contributed by a monomer molecule to the structure of a polymer;
"copolymer" refers to a polymeric material comprising at least two different interpolymerized monomers (i.e., the monomers do not have the same chemical structure) and includes terpolymers (three different monomers), tetrapolymers (four different monomers), etc.; and
"polymer" refers to a polymeric material comprising interpolymerized units of the same monomer (a homopolymer) or of different monomers (a copolymer).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

Disclosed herein is a latex coating composition comprising particles of polymer, wherein the polymer comprises pendent quaternary ammonium groups. Such latexes can be used to form a release coating.

The polymer of the present disclosure comprises at least one repeat unit according to Formula I

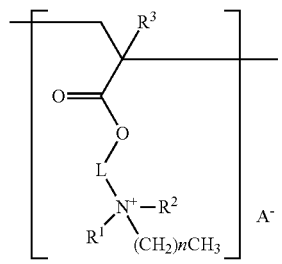

wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11 to 21, and A is an anion.

L is a divalent alkylene group comprising 1-4 carbon atoms. Exemplary divalent alkylene groups for L include: $-CH_2-$, $-(CH_2)_2-$, $-(CH_2)_3-$, $-(CH_2)_4-$, $-CHCH_3-$, and $-CHCH_3CH_2-$.

$R^1$ and $R^2$ are independently selected from a monovalent alkyl group comprising 1 to 3 carbon atoms. Exemplary monovalent alkyl groups for $R^1$ and $R^2$ include $-CH_3$, $-CH_2CH_3$, $-(CH_2)_2CH_3$, and $-CH(CH_3)_2$.

The subscript n is an integer from 11 to 21, for example, 11, 12, 13, 14, 15, 16, 17, 18, 19, 20, or 21.

A is a counter ion associated with the quaternary ammonium group. Exemplary anions include chloride (Cl), a bromide (Br), a tetrafluoroborate ($BF_4$), an N-fluorobis(trifluoromethanesulfonyl)imide ($N(SO_2CF_3)_2$), a trifluoromethanesulfonate ($OSO_2CF_3$), a nonafluorobutanesulfonate ($OSO_2C_4F_9$), a methylsulfate ($OSO_3CH_3$), a gluconate ($C_6H_{11}O_7$), or an acetate ($C_2H_3O_2$). The counter ion is an anion, which may carry a charge of −1, −2, −3, etc. It is noted that there is a balance in charge between the counter ion and the segment according to Formula I. For example, if the anion carries a −2 charge, then it would be charge balanced with 2 segments of the cationic polymer within Formula I.

At least 60, 65, 70, 75, 80, 85, 90, or even 95% by weight of the repeating monomeric units that make up the polymer may be segments according to Formula I.

In some embodiments, the term "polymer" can refer to a molecular chain of at least 50, 100, 200, 500, 1000, or even 5000 monomeric repeat units of Formula I; and typically, not more than 20000 monomeric repeat units of Formula I.

The polymer of the present disclosure can be derived from the polymerization of a quaternary ammonium-containing, ethylenically unsaturated monomer according to Formula II:

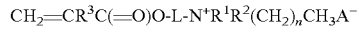

wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11-21, and A is an anion.

L is a divalent alkylene group comprising 1-4 carbon atoms. Exemplary divalent alkylene groups for L include: $-CH_2-$, $-(CH_2)_2-$, $-(CH_2)_3-$, $-(CH_2)_4-$, $-CHCH_3-$, and $-CHCH_3CH_2-$.

$R^1$ and $R^2$ are independently selected from a monovalent alkyl group comprising 1 to 3 carbon atoms. Exemplary monovalent alkyl groups for $R^1$ and $R^2$ include $-CH_3$, $-CH_2CH_3$, $-(CH_2)_2CH_3$, and $-CH(CH_3)_2$.

A is a counter ion associated with the quaternary ammonium group such as those disclosed above.

Suitable examples of the monomer according to Formula II can include dimethylhexadecylammoniumethylacrylate halides (DMAEA-$C_{16}$ halides, e.g., dimethylhexadecylammoniumethylacrylate bromides (DMAEA-$C_{16}$Br)) and dimethylhexadecylammoniumethylmethacrylate (DMAEMA-$C_{16}$ halides, e.g., dimethylhexadecylammoniumethylmethacrylate bromides (DMAEMA-$C_{16}$Br)), and derivatives thereof. Such monomers may be synthesized as shown in the Example Section.

In one embodiment, the polymer of the present disclosure is a homopolymer, derived only from monomers according to Formula II.

In another embodiment, the polymer is a copolymer, derived from the monomer according to Formula II and at least one additional monomer, which is not according to Formula II. In one embodiment, the at least one additional monomer is a water-soluble monomer (wherein water-soluble means at least 1, 2, or even 3 g of monomer dissolves in 100 mL of water). Exemplary water-soluble monomers include acrylonitrile, N-vinyl pyrrolidone, N-vinyl caprolactam, N-vinyl pyridine, dimethyl acrylamide, acrylamide, acrylic acid, methyl acrylate, methyl methacrylate, and mixtures thereof.

The monomers of Formula II, and optional additional monomers can be free radically polymerized using techniques known in the art. If additional monomers are used, the additional monomeric units may be randomly polymerized into the polymer chain. In one embodiment, the polymer is substantially free, comprising less than 1, 0.5, 0.1, 0.05, 0.01 wt (weight) %, of an acrylate or methacrylate interpolymerized monomer unit that is not according to Formula I.

Ideally, the polymerization is an aqueous-based polymerization, wherein the monomers are polymerized in water, using a free radical initiator. Additional surfactants may or may not be used to stabilize the polymerization. In one embodiment, the resulting latex is substantially free (e.g., less than 1, 0.5, or even 0.1 wt %) of an additional surfactant.

The monomers of Formula II, and optional additional monomers are polymerized to form particles of polymer in an aqueous solution, referred to as a latex.

Traditionally, release coatings are prepared from solvent-based systems, where monomers having long-chain pendent groups are polymerized in organic solvents and then used to provide release coatings. There has been an ongoing emphasis to develop aqueous-based release coatings, which may be more environmentally friendly and/or less expensive to manufacture and coat due to the absence of organic solvents, which are more expensive to handle. It has been discovered that by preparing release coatings using the polymers disclosed herein in an aqueous vehicle, and when dried at lower temperatures, the release coatings have improved release and/or readhesion properties. The latex coating composition of the present disclosure comprises polymer particles provided in an aqueous liquid vehicle, wherein aqueous means at least 50, 60, 70, 80, 90, or even 95% by weight of the liquid is water. In one embodiment, 100% by weight of the aqueous liquid vehicle is water. In one embodiment, a co-solvent is used, including acetone, acetonitrile, and alcohols, such as methanol, ethanol, isopropyl alcohol, etc. The coating composition should be non-flammable. Non-flammability can be assessed by using standard methods such as ASTM D-3278-96 e-1, D56-05 "Standard Test Method for Flash Point of Liquids by Small Scale Closed-Cup Apparatus".

In one embodiment, the polymer particles have an average particle diameter of at least 20, 25, 30, 40, 50, or even 60 nm; and no more than 80, 90, 100, or even 120 nm as determined by techniques known in the art including light scattering.

The desired solids concentration of the latex coating composition to make a coating depends upon the method of coating and upon the desired coating thickness. In one embodiment, the latex coating composition has a polymer solids percentage of at least 0.2, 0.5, 1.0, 1.5, or even 2% by weight. In one embodiment, the latex coating composition has a polymer solids percentage of at most 2, 3, 4, 5, 7, or even 8% by weight. Typically, the latex coating composition obtained from the aforementioned polymerization processes comprises a higher percentage of solids such as between 5 to 35 wt % polymer solids. Thus, if necessary, additional aqueous liquid vehicle, such as water, may be added to achieve the desired solids content for coating.

In addition to the polymer particles, the latex coating composition may further comprise additives to improve the properties of the latex coating composition (such as Theological properties, film-forming properties, etc.) and/or the performance of the resulting formed film (e.g., ink receptivity, etc.). Exemplar additives include a wetting agent, coalescing agent, surfactant, etc.

In one embodiment, a wetting agent may be used to enable the latex coating composition to homogeneously coat the substrate. Exemplary wetting agents include non-aqueous liquids such as glycol ethers, and some alcohols (such as octanol, isopropanol, ethanol, butanol, methanol, and hexanol). Wetting agents may be used in amounts up to 10% by wt as long as the coating composition remains non-flammable.

An additional surfactant may be added to aid the stability of the latex and/or assist in wetting of the substrate surface. In one embodiment the latex coating composition is substantially free (e.g., less than 1, 0.5, or even 0.1 wt %) of a non-polymerizable surfactant. In other words, a non-polymerizable surfactant is a compound, which (i) does not have unsaturation and (ii) is nonionic, or cationic in nature. Exemplary non-polymerizable nonionic surfactants include: block copolymers of ethylene oxide and propylene oxide, such as those sold under the trade names PLURONIC, KOLLIPHOR, or TETRONIC, by the BASF Corporation of Charlotte, NC, USA; ethoxylates formed by the reaction of ethylene oxide with a fatty alcohol, nonylphenol, dodecyl alcohol, and the like, including those sold under the trade designation TRITON, by the Dow Chemical Company of Midland, MI, USA; oleyl alcohol; sorbitan esters; alkylpolyglycosides such as decyl glucoside; sorbitan tristearate; and combinations of one or more thereof. Exemplary non-polymerizable cationic surfactants include: cocoalkylmethyl [polyoxyethylene (15)] ammonium chloride, benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N.V. of Amsterdam, the Netherlands, under the trade designations ETHOQUAD, ARQUAD, and DUOQUAD; and mixtures thereof. Of particular use in forming oil-in-water emulsions for polymerization of the zwitterionic polymers of the disclosure, are the ETHOQUAD surfactants, for example, ETHOQUAD C/12, C/25, C/12-75, and the like.

Although not wanting to be limited by theory, it is believed that the quaternary ammonium enables the water dispersibility of the polymer and due to its cationic nature, in some embodiments, a surfactant is not needed in the latex coating composition.

The latex coating composition comprising polymers having the repeat unit according to Formula I may be used in combination with one or more other latexes. The latex coating composition of the present disclosure may be combined with a solution of a water-soluble polymer, a dispersion of a water-dispersible polymer, a polymer latex, an inorganic colloidal dispersion, or mixtures thereof.

The latex coating composition of the present disclosure can be coated onto any suitable substrate to form a wet-coated substrate. In one embodiment, the substrate is a sheet, a fiber, or a shaped object. However, the preferred substrates are those which are used for adhesive products, including paper, metal sheets and foils, nonwoven fabrics, and films of thermoplastic resins such as polyesters (such as polyethylene terephthalate), polyamides, polyolefins (such as polypropylene and polyethylene), polycarbonates, polyvinyl chloride, polyethylene vinyl acetate, etc. Potentially useful polymeric substrate materials are disclosed in U.S. Pat. No. 5,516,581 (Kreckel et al.) and U.S. Pat. No. 6,403,206 (Bries et al.). Representative examples of potentially useful polymeric substrate materials for polymeric foam layers or solid polymeric film layers include polyurethane; polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof. Mixtures or blends of any plastic or plastic and elastomer materials, such as polypropylene/polyethylene, polyurethane/polyolefin, polyurethane/polycarbonate, and polyurethane/polyester, can also be used.

The latex coating composition may be applied to a suitable substrate by means of conventional coating techniques such as wire-wound rod, direct gravure, offset gravure, reverse roll, air-knife, and trailing blade coating. Primers known in the art can be utilized to aid in the adhesion of the latex coating to the substrate, but they are not generally necessary. In one embodiment, the support is treated (e.g., corona treated) before application of the latex coating to improve bonding between the support and the release coating layer. The wet-coated substrate is then dried to form, for example, the release coating on the substrate.

In one embodiment, the thickness of the dried coating layer is at least 50, 60, 70, 80, 90 or even 100 nm; and at most 150, 200, 150, 300, 350, 400, or even 500 nm.

The resultant coatings provide effective release for a wide variety of conventional pressure-sensitive adhesives such as natural rubber-based, acrylic, and other synthetic film-forming elastomeric materials. The coating thus obtained is capable of providing a medium release, (i.e., at least 0.1, 0.5, or even 1 N/10 mm and at most 1.5, 2.0, or even 2.5 N/10 mm) against aggressive pressure-sensitive adhesives (e.g., those having an adhesion to glass of at least 2.5 N/10 mm).

The latex coating composition of the present disclosure can be used to provide a release coating on the backside (in other words, the side opposite the adhesive coating) of the tape in a roll of tape, where a tape includes a flexible backing member, a pressure-sensitive adhesive coating on one major surface of the backing member, and a release coating on the opposite major surface of the backing comprising the polymer described herein. The present disclosure further provides a transfer tape comprising a film of pressure-sensitive adhesive between two release liners, each comprising a release coating, wherein at least one of the release coatings is derived from the latex coating composition disclosed herein.

The release coatings as disclosed herein are aqueous-based and thus, eliminate and/or minimize environmental concerns, flammability, and costs usually associated with solvent-borne coatings.

It has been discovered that the release coatings disclosed herein are able to film form at low temperatures. For example, upon coating, the latex coating compositions of the present disclosure are able to form a film at temperatures of no more than 70, 50, 40, 30, or even 25° C. In other words, the aqueous vehicle and optional additives in the latex coating composition evaporate and the polymer particles relax and/or anneal to form a film. Although not wanting to be limited by theory, it is believed that the presence of the ionic group, not only aides in the water dispersibility of the polymer, but also acts as a plasticizer, enabling the polymer particles to relax and the hydrophobic chains to orient, forming a durable film at temperatures lower than typical polymers. This can be advantageous when using a substrate having a lower melting point, such as polypropylene. Unexpectedly, it has been discovered that polymers of the present disclosure in an aqueous vehicle can be dried at lower temperatures (such as 50° C.) and still achieve good performance results.

Typically, in a release coating, the coating is dried at a temperature of at least about 5° C. or even 10° C. above the highest melting point of the latex polymer in order to obtain a coating possessing good release properties. In the present disclosure, it has been discovered that the polymers of the present disclosure have a substantially different (e.g., at least 40, 50, 60° C. or more difference) melting temperature based on whether the polymer is in a dried or latex form. It is believed that suppression of the melting transition in the latex form permits coating at lower temperatures (such as at or below 50° C.) while achieving good release performance with minimal transfer of the release coating, for example, onto the adhesive.

In one embodiment, the coating compositions of the present disclosure have a release peel strength of at least 0.1, 0.2, 0.3, or even 0.5 N/10 mm; and at most 1, 1.5, 2, or even 2.5 N/10 mm.

In one embodiment, the coating compositions of the present disclosure has low transfer of the release agent to the adhesive. This can be observed by testing the readhesion peel strength. An adhesive is first contacted with the release coating, removed from the release coating, and then applied to a substrate. The peel strength to remove the adhesive from the substrate is measured and compared to a control (i.e., an adhesive that did not have contact with the release coating). Preferably, the readhesion peel strength should be similar to the control, indicating minimal transfer of the release agent onto the adhesive. In one embodiment, the coating compositions of the present disclosure has a readhesion peel strength of at least 75, 80, 85, 90, or even 95% of the peel strength of the adhesive that was not in contact with the release coating.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

TABLE 1

Materials List

| Designation | Description |
|---|---|
| DMAEA | 2-(Dimethylamino)ethylacrylate obtained from Alfa Aesar Co., Tewksbury, MA |
| DMAEMA | 2-(Dimethylamino)ethyl methacrylate obtained from Alfa Aesar Co., Tewksbury, MA |
| C16Br | 1-Bromohexadecane obtained from Alfa Aesar Co., Tewksbury, MA |
| Acetone | Acetone obtained from Alfa Aesar Co., Tewksbury, MA |
| BHT | Antioxidant, butylated hydroxytoluene, obtained from Sigma Aldrich Co. |
| MEHQ | Inhibitor, monomethyl Ether of Hydroquinone obtained from Alfa Aesar Co., Tewksbury, MA |
| EtOAc | Ethyl acetate obtained from Alfa Aesar Co., Tewksbury, MA |
| V-50 | Water soluble initiator, 2,2'-Azobis(2-methylpropionamidine), dihydrochloride available under the trade designation "V-50" from Wako Pure Chemical Ind., Ltd., Osaka, Japan. |
| Vazo 67 | Oil soluble initiator, 2,2'-Azodi(2-methylbutyronitrile, available under the trade designation "VAZO 67" from Sigma Aldrich Co. |
| NVC | N-vinyl caprolactam, available under trade designation "under the trade designation "V-Cap vinyl caprolactam" from Ashland Global Holdings Inc., Covington, KY |
| P-20 | Polyvinyl Octadecyl Carbamate dispersion, available under trade designation "ESCOAT P-20 Dispersion Release Coat" obtained from MAYZO Co, Suwanee, GA. |
| HP-114 | Water-based non-silicone release polymer, available uner trade designation "SUNCRYL HP 114" from OMNOVA Solutions Inc., Beachwood, OH. |

General Procedures

PROCEDURE A. Synthesis of DMAEA-C16Br monomer (Q-16 monomer) where $R^3$ is H, L is $CH_2CH_2$, $R^1$ and $R^2$ are $CH_3$, n is 15 and $A^-$ is Br:

A reactor fitted with over-head condenser, mechanical stirrer, and temperature probe, was charged with 918 parts (g) by weight of Acetone, 807 parts by weight of C16Br, 388.6 parts by weight of DMAEA, 2.0 parts by weight of BHT, and 2.0 parts by weight of MEHQ. The batch was stirred at 150 revolutions per minute (rpm) and a gas stream of 90/10 by volume of $O_2/N_2$ was used throughout the reaction. The mixture was heated to 74° C. for 18 hours. A sample was taken out for analysis by gas chromatography (GC), which revealed a conversion of greater than 98% by wt. Then, 918 parts by weight of EtOAc was added slowly while stirring at very high speed. A white solid started to precipitate out. The heating was stopped and the mixture was cooled to room temperature. The reaction mixture was filtered and the white solid precipitate was washed with 200 parts by weight of cold EtOAc. The recovered precipitate was transferred to a tray and dried in a vacuum oven at 40° C. for 8 hours. The product was analyzed by nuclear magnetic resonance (NMR) and its spectrum revealed the presence of greater than 95 wt % of Q16 monomer.

PROCEDURE B. Synthesis of DMAEMA-C16Br monomer (mQ-16 monomer) where $R^3$ is $CH_3$, L is $CH_2CH_2$, $R^1$ and $R^2$ are $CH_3$, n is 15 and $A^-$ is Br:

m-Q16 was made similarly to the Q-16 monomer, as above, except using 415.5 part of DMAEMA instead of DMAEA. The recovered precipitate was analyzed by NMR, and the spectrum revealed the presence of greater than 95 wt % of DMAEMA-C16Br monomer.

PROCEDURE C. Polymer Synthesis poly(Q-16) where $R^3$ is H, L is $CH_2CH_2$, $R^1$ and $R^2$ are $CH_3$, n is 15 and $A^-$ is Br:

A 0.47 liters (16 ounce) glass bottle with a 2.54 centimeters (1 inch) plastic cap was used. 90 g of deionized water was charged into the bottle followed by addition of 10 g Q-16 monomer, and 0.2 g V-50. The reaction mixture was purged with nitrogen for 2 minutes then the bottle was closed tight. Next, the bottle was immersed in a LAUNDER-OMETER (available from SDL ATLAS, Rock Hill, SC) bath set at 50° C. and the reaction mixture was continuously tumbled for 18 hours, resulting in a Q-16 polymer latex.

The resulting Q-16 polymer latex was analyzed by differential scanning calorimetry, by cooling the sample to 5° C. then monitoring for any transitions as the sample was heated at 10° C./min to a temperature of about 75° C. No transitions were observed in the thermogram.

The resulting Q-16 polymer latex was dried and the dried Q-16 polymer was then analyzed by differential scanning calorimetry, by cooling the sample to 5° C. then monitoring for any transitions as the sample was heated at 10° C./min to a temperature of about 120° C. The thermogram showed a broad melt transition centered around 100° C., which started at around 60° C. and continued through 120° C.

PROCEDURE D. Polymer Synthesis poly(mQ-16/NVC) which is a copolymer of Formula I, where $R^3$ is $CH_3$, L is $CH_2CH_2$, $R^1$ and $R^2$ are $CH_3$, n is 15, and $A^-$ is Br and an N-vinyl caprolactam monomeric unit A 0.47 liters (16 ounce) glass bottle with a 2.54 centimeter (1 inch) diameter plastic cap was used. 90 g of deionized water was charged into the bottle followed by addition of 8.5 g mQ-16 monomer, 1.5 g NVC, and 0.2 g V-50. The reaction mixture was purged with nitrogen for 2 minutes; then the bottle was closed tight. Next, the bottle was immersed in a LAUNDER-OMETER bath set at 50° C. and the reaction mixture was continuously tumbled for 18 hours, resulting in a mQ-16/NVC polymer latex.

PROCEDURE E. Preparation of Release Coated Films:

Release coated samples were prepared by coating the designated latex (from PROCEDURE C or D diluted to 2.5 to 5 wt % solids) onto a corona treated biaxially oriented polypropylene (BOPP) film substrate having a 0.036 millimeter (0.0014 inch) thickness. The latex coating was applied onto the corona-treated side of the BOPP film using a Mayer Rod RDS 2.5. The coated substrates were then dried in a forced air oven at either 50° C. or 100° C. as noted for 2 minutes immediately following coating.

PROCEDURE F. Release Peel Strength

The release performance of release coated samples was tested by applying a 2.54 cm (1 inches) by approximately 25.4 centimeters (10 inches) long strip of packaging tape (available under the trade designation "SCOTCH 3850 HEAVY DUTY SHIPPING/PACKAGING TAPE" from 3M Co., Maplewood, MN) onto the release coated side of the designated sample. A 2 kilogram (4.5 pound) rubber roller was then rolled twice back and forth over the laminated assembly. The laminated assembly was aged in an oven set at 50° C. for 7 days. Lint free tissues were placed between samples to insure air circulation and prevent any binding of the sheets together. After 7 days, the laminated assemblies then were placed in a controlled temperature and humidity room (23° C. with 50% humidity) for at least 24 hours before testing. The peel strength of the release coating was tested by peeling the tape from the release coated sample using a peel tester (Model IMASS SP-2000 Slip/Peel Tester, available from IMASS, Incorporated, Accord, MA) at an angle of 180 degrees and at a rate of 228.6 centimeters/minute (90 inches/minute) with an averaging time of 2 seconds. At least four peel test measurements were performed for each of the samples and the results were recorded and averaged in ounces force/inch (Newtons/10 mm).

PROCEDURE G. Re-adhesion Glass Peel Strength

After performing PROCEDURE E, the tape portion was applied to a glass substrate to test for the transfer of the release coating to the adhesive. The air side of annealed float glass plates, measuring 12 inches (30 centimeters) long by 6 inches (15 centimeters) wide (from Brin Northwestern Glass Co., Minneapolis, MN), were prepared for testing by cleaning with the solvents in the following order heptane, isopropanol, and methyl ethyl ketone and scrubbing with a clean tissue (available under the trade designation KIM-WIPE, available from Kimberly-Clark Corporation, Neenah, WI) with the last cleaning taking place immediately preceding application of the tape. The "used" tape from PROCEDURE E was applied to the cleaned glass plates and a 2 kilogram (4.5 pound) rubber roller was rolled twice back and forth over the tape and glass. Within a minute after applying the tape, the peel test was run at an angle of 180 degrees and at a rate of 228.6 centimeters/minute (90 inches/minute) with an averaging time of 2 seconds using the peel tester as described above. At least four peel test measurements of each sample were evaluated, and the results were recorded and averaged in ounces force/inch (Newtons/10 mm).

Example 1 (Ex 1)

Poly(mQ-16) was coated as described using PROCEDURE E. The peel strength of the release coating and its transfer to adhesive were tested using PROCEDURES F and G.

Example 2 (Ex 2)

Poly(mQ-16/NVC) was coated as described using PROCEDURE E. The peel strength of the release coating and its transfer to adhesive were tested using PROCEDURES F and G.

Comparative Example 1 (CE 1)

P-20 was coated as described using PROCEDURE E. The peel strength of the release coating and its transfer to adhesive were tested using PROCEDURES F and G.

Comparative Example 2 (CE 2)

HP114 was coated as described using PROCEDURE E. The peel strength of the release coating and its transfer to adhesive were tested using PROCEDURES F and G.

Comparative Example 3 (CE 3)

Solvent-based release coating composition of the quaternary ammonium polymer. In a 4 ounce (0.1 liter) amber glass bottle, 27 grams of toluene and 8 grams of methanol were charged into the bottle followed by the addition of 15 grams of Q-16 monomer. The bottle was rolled until the monomer dissolved, then the reaction mixture was purged with nitrogen for 2 minutes at 1 liter per minute. Then, 0.15 grams of Vazo 67 was added. The bottle was immediately closed tight and rolled for 10 minutes. Next, the bottle was immersed in a LAUNDER-OMETER water bath set at 60° C. and the reaction mixture was continuously tumbled for 24 hours at 24 revolutions per minute. The bottle was then cooled and opened. The reaction solution was poured into acetone to precipitate the polymer at a ratio of 1:23 (reaction solution:acetone) while stirring at 500 revolutions per minute. The precipitate was vacuum filtered and dried for 48 hours in crossflow air current. Then a portion of the precipitate was dissolved at 5 wt % in a 10:1 weight ratio of a toluene:ethanol mixture for coating. The coating was coated using PROCEDURE E. The peel strength of the release coating and its transfer to adhesive were tested using PROCEDURES F and G.

Comparative Example 4 (CE 4)

The peel strength of a commercial packaging tape (available under the trade designation "SCOTCH 3850 HEAVY DUTY SHIPPING/PACKAGING TAPE" and its transfer to the adhesive were tested using PROCEDURES F and G.

Table 2 shows the results from the samples, wherein the release coatings of Ex 1-2 and CE 1-3 were dried for 2 minutes at 100° C. or 50° C. and then tested for release peel strength of the release coatings from the adhesive of the packaging tape followed by testing the peel strength performance of the adhesive on glass.

TABLE 2

| Sample | Release Peel Strength Oz/in (N/10 mm) | | Readhesion on Glass Oz/in (N/10 mm) | |
|---|---|---|---|---|
| CE 4 | 3.4 ± 0.2 (0.38 ± 0.02) | | 51.8 ± 2.1 (5.69 ± 0.23) | |
| Drying Temp. | 100° C. | 50° C. | 100° C. | 50° C. |
| CE 1 | 3.4 ± 0.2 (0.37 ± 0.02) | 56.9 ± 0.5 (6.25 ± 0.05) | 54.1 ± 4.1 (5.94 ± 0.45) | 16.5 ± 1.8 (1.81 ± 0.19) |
| CE 2 | 2.5 ± 0.3 (0.27 ± 0.04) | 54.5 ± 0.4 (5.99 ± 0.04) | 62.4 ± 0.4 (6.86 ± 0.05) | 35.1 ± 2.8 (3.86 ± 0.31) |
| CE 3 | 3.6 ± 0.3 (0.40 ± 0.03) | 6.0 ± 0.4 (0.66 ± 0.05) | 57.1 ± 3.3 (6.27 ± 0.36) | 30.3 ± 3.8 (3.33 ± 0.41) |
| Ex 1 | 5.1 ± 0.2 (0.56 ± 0.03) | 5.1 ± 0.1 (0.56 ± 0.01) | 57.6 ± 4.7 (6.33 ± 0.52) | 46.4 ± 5.2 (5.10 ± 0.57) |
| Ex 2 | 7.0 ± 0.4 (0.76 ± 0.04) | 8.5 ± 0.5 (0.93 ± 0.05) | 44.0 ± 2.3 (4.83 ± 0.25) | 43.8 ± 1.4 (4.82 ± 0.15) |

As shown in Table 2, Ex 1 and Ex 2 had similar peel strength to a commercial release coating CE4 as well as the three dispersions, CE 1-3, dried at 100° C. However, when dried at 50° C., the peel strength of CE1 and CE 2 increased by an greater than an order of magnitude, whereas examples of the present disclosure still had good release peel strength as shown in Table 2. In the readhesion on glass, Ex 1 and Ex 2 and CE 1-CE 3, when dried at 100° C., all showed readhesion to glass within 20% of the control (CE 4). However, when dried at 50° C., Ex 1 and Ex 2 were still within 20% of the control, whereas CE1-CE3 were not.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A release coated article comprising a substrate and a release coating disposed thereon, wherein the substrate is a polymeric substrate and the release coating, derived from an aqueous-based coating composition, comprises a polymer having at least 60 weight % of interpolymerized divalent monomer units represented by the segment according to formula I

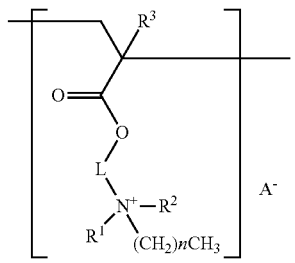

wherein $R^3$ is H or $CH_3$, L is an alkylene group comprising 1-4 carbon atoms, $R^1$ and $R^2$ are independently selected from an alkyl group comprising 1 to 3 carbon atoms, n is an integer from 11 to 21, and A is a counter anion, wherein the polymer comprises at least 50 segments according to formula I.

2. The release coated article of claim 1, wherein the polymer further comprises a repeat unit derived from at least one of acrylonitrile, N-vinyl pyrrolidone, N-vinyl caprolactone, N-vinyl pyridine, dimethyl acrylamide, acrylamide, acrylic acid, methyl acrylate, and methyl methacrylate.

3. The release coated article of claim 1, wherein the release coating is substantially free of an additional surfactant.

4. The release coated article of claim 1, wherein the release coating has a release peel strength of no more than 2.5 N/10 mm.

5. The release coated article of claim 1, wherein the release coating has a readhesion peel strength of at least 80% of a control, wherein the control was not in contact with the release coating.

6. The release coated article of claim 1, wherein the release coating is substantially free of a non-polymerizable surfactant.

7. The release coated article of claim 1, wherein the polymer further comprises an interpolymerized monomeric repeat unit derived from a water-soluble monomer.

8. The release coated article of claim 1, wherein n is 15, 16, or 17.

9. The released coated article of claim 1, wherein the counter ion is a bromine or a chlorine anion.

10. The released coated article of claim 1, wherein the substrate comprises polypropylene, polyethylene, ethylene vinyl acetate, or combinations thereof.

11. The released coated article of claim 1, wherein the release coating has a thickness of 80 to 500 nm.

* * * * *